Figure 1:
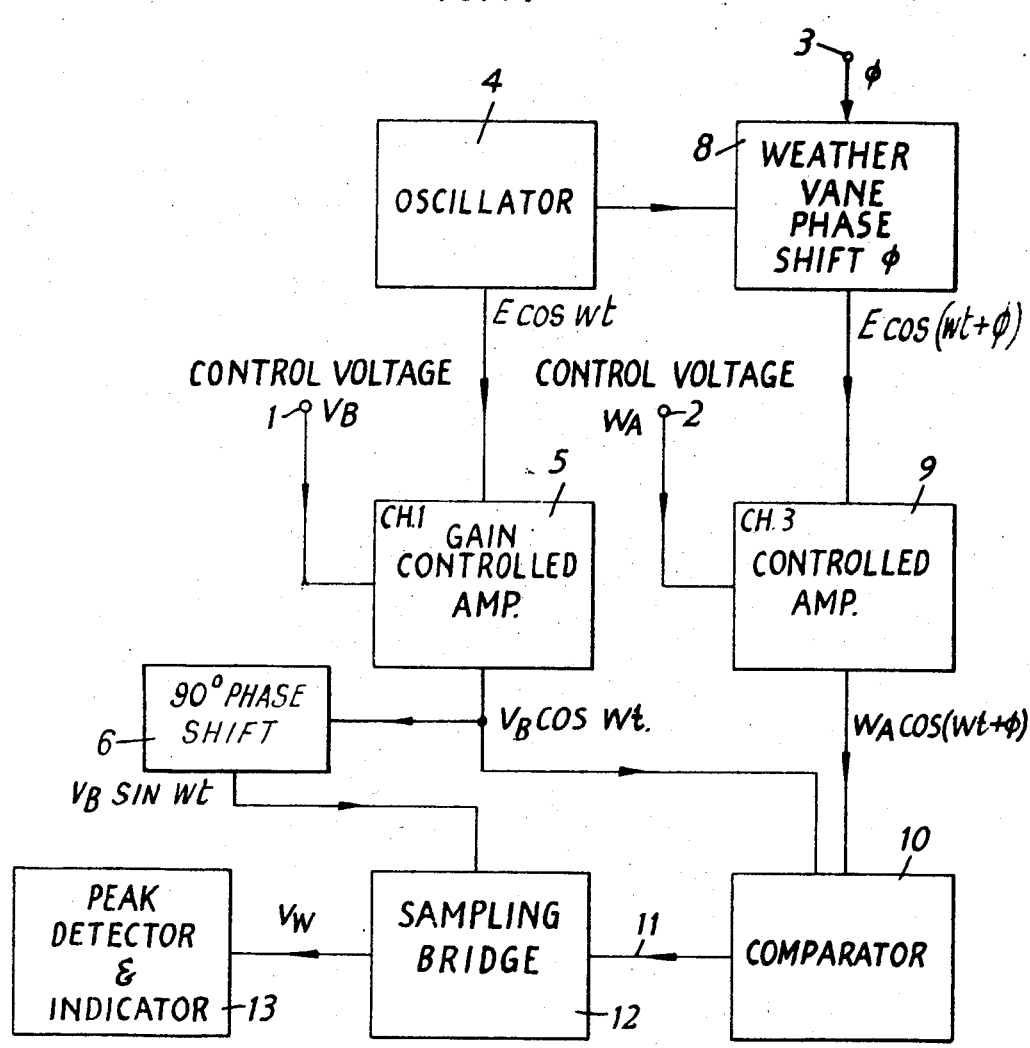

United States Patent [19]
Etherington

[15] 3,657,726
[45] Apr. 18, 1972

[54] FUNCTION EVALUATING APPARATUS
[72] Inventor: Michael Etherington, San Mateo, Calif.
[73] Assignee: Electric & Musical Industries Limited, Hayes, Middlesex, England
[22] Filed: Dec. 19, 1969
[21] Appl. No.: 886,557

[30] Foreign Application Priority Data
Dec. 19, 1968 Great Britain .................... 60,277/68

[52] U.S. Cl. .................. 235/150.2, 235/150.26, 235/186, 235/189
[51] Int. Cl. .................................. G06g 7/78, G06g 7/22
[58] Field of Search .................. 235/150.2, 150.26, 186, 189

[56] References Cited

UNITED STATES PATENTS 3,028,504  4/1962  Close .................................. 235/186

Primary Examiner—Malcolm A. Morrison
Assistant Examiner—R. Stephen Dildine, Jr.
Attorney—William W. Downing, Jr.

[57] ABSTRACT

Apparatus for evaluating a first function of a variable, the variable being determined by the solution of an equation represented by the equality of two other functions of the variable, includes means which produce a first electrical signal which oscillates so as to periodically set up successive representations of the first function for different values of the variable, and means which produce two further electrical signals which oscillate so as to periodically set up successive representations of the two other functions for corresponding values of the variable. Instants of equality of the two further electrical signals are detected and the first electrical signal is sampled at such instants for evaluating the first function of the variable. Such apparatus adapted for evaluating the speed of a yacht to windward or downwind is disclosed.

4 Claims, 2 Drawing Figures

FUNCTION EVALUATING APPARATUS

This invention relates to function evaluating apparatus, and it relates especially though not exclusively to function evaluating apparatus for evaluating the speed to windward of a yacht, utilising parameters which can be obtained from instruments on the yacht.

In yacht racing, especially ocean racing, it is usual to have one leg of the course directly to windward. This requires competing yachts to tack over this part of the course and presents the helmsman with the problem of selecting the optimum heading in order that the best possible speed to windward may be achieved. Relatively simple instruments are available, suitable for use on board yachts, which can measure the speed of the yacht through the water, the apparent wind direction and the apparent wind speed. From this information it is possible to evaluate the speed made good to windward (neglecting tidal movement) but usually it is not feasible for the helmsman to carry out the necessary computations.

The speed made good to windward can be evaluated by solving two simultaneous equations, and while the solution of such equations can be effected by analogue computers, a function evaluating apparatus which would be attractive for use on yachts has to be relatively simple and inexpensive.

It is an object of the present invention is to provide such function evaluating apparatus.

According to the present invention there is provided apparatus for evaluating a first function of a variable, the variable being determined by the solution of an equation represented by the equality of two other functions of said variable, comprising:

a. means adapted for producing a first electrical signal which oscillates so as to periodically set up successive representations of said first function of said variable for different values of said variable, b. means adapted for producing two further electrical signals which oscillate so as to periodically set up successive representations of said two other functions of said variable for corresponding values of said variable, c. means for detecting instants of equality of said two further electrical signals, and d. means for sampling said first electrical signal at one or more such instants for evaluating said first function of said variable.

Figure 2:
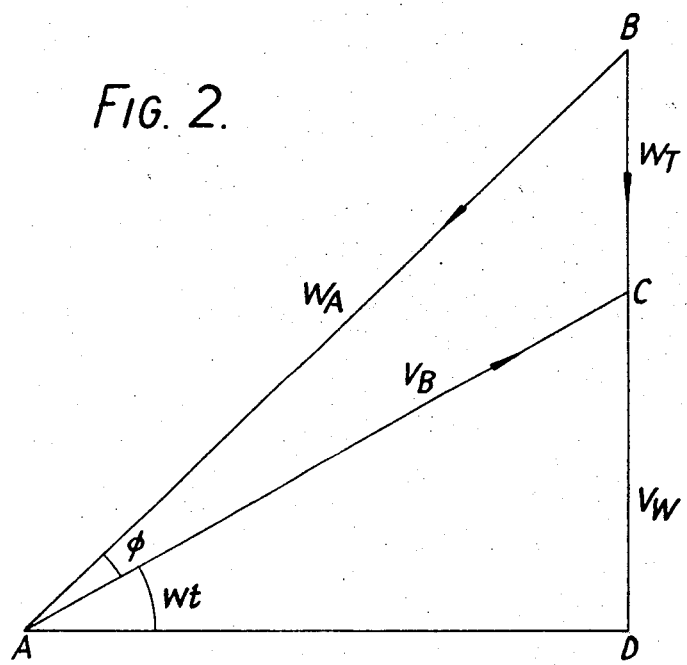

In order that the invention may be clearly understood and readily carried into effect it will now be described with reference to the accompanying drawings in which:

FIG. 1 is a block diagram of a function evaluating apparatus according to one example of the invention, and FIG. 2 is a diagram illustrating the operation of the apparatus illustrated in FIG. 1.

The apparatus illustrated in FIG. 1 is arranged to utilise input signals representing the speed of the yacht through the water $V_B$, the apparent speed of the wind $W_A$ and the apparent wind direction $\emptyset$ with respect to the yacht's heading. It may be assumed that these parameters are obtained by using a log, an anemometer and a recording wind vane respectively. The three input signals are applied to input points 1, 2 and 3. The signal representing $\emptyset$ may be a shaft rotation.

The above three parameters are represented in the diagram shown in FIG. 2 and this figure illustrates that the vector triangle ABC can be drawn to deduce the true wind direction and speed $W_T$. The speed to windward $V_W$ can then be represented by completing the right angled triangle ACD formed by dropping a perpendicular from A on BC produced. Let the unknown angle in this triangle be $\omega t$. It can then be seen that the speed to windward is related to the measured parameters by the equations:

$$V_{W\cdot 1} = V_B \sin \omega t \qquad (1)$$

and $$V_B \cos \omega t = W_A \cos (\omega t + \emptyset) \qquad (2)$$

In the above Cos $\omega t$ represents an instantaneous value of an alternating voltage, and the unknown angle $\omega t$ can be evaluated by noting the instants $t$ at which the two alternating voltages represented by opposite sides of the equation (2) are equal. This equality will occur at two instants per cycle, either or both of which may be used since only the magnitude of $V_W$ is required. If the alternating voltage represented by the right hand side of the equation (1) is then sampled at said instants of equality, the sampled values of the alternating voltage are a representation of the speed to windward.

Returning to FIG. 1, the apparatus illustrated comprises an oscillator 4 which produces an alternating voltage of arbitrary peak value E cos $\omega t$. This is applied firstly to a gain controlled amplifier 5; and secondly via a variable phase shifting circuit 8 to a second gain controlled amplifier 9. The signal applied to input point 1 representing the parameters $V_B$ is the gain control signal for the amplifier 5. The signal applied to the input point 2 representing the parameter $W_A$ is the gain control signal for the amplifier 9. The input signal to the amplifier 5 is E Cos $\omega t$, and the input signal to the amplifier 9 is E Cos ($\omega t + \emptyset$), the phase shift $\emptyset$ being imparted by the circuit 8 in response to the input signal applied to the input point 3. Each of the amplifiers is set up so as to preserve phase between input and output but to produce an output signal having peak value proportional to the applied gain control voltage. The output signals of the amplifiers 5 and 9 are applied to a comparator 10 which is arranged to produce an output pulse on the lead 11 each time the two applied signals are equal. As the latter two signals are respectively proportional to $V_B$ Cos $\omega t$ and $W_A$ Cos ($\omega t + \emptyset$), output pulses are therefore produced on the lead 11 at the instants when $\omega t$ represents the unknown angle in the vector diagram of FIG. 2, two such pulses being produced per cycle. The pulses on the lead 11 are fed to a sampling bridge 12, the input signal for which is the output from the amplifier 5 phase shifted by 90° by the phase shifter 6, and is therefore an alternating voltage represented by $V_B$ Sin $\omega t$, namely the right hand side of equation (1). At the sampling instants therefore, the value of the output pulses from the sampling bridge 12 represents the speed made to windward, and these pulses are fed to a peak detector and indicator 13. The peak detector serves to store a voltage representing the required speed for presentation on a meter or a digital display device. No distinction is made in the computer between port and starboard, and the apparatus is equally applicable to use downwind.

Sampling may be carried out at either or both of the instants when the two inputs to the comparator 10 show equality. If sampling is carried out twice in each cycle of the input to the bridge 12 the detector included in the circuit 13 should be bi-directional.

What I claim is:

1. Apparatus for evaluating first function of a variable, the variable being determined by the solution of an equation represented by the equality of two other functions of said variable, comprising a. means adapted for producing a first electrical signal which oscillates so as to periodically set up successive representations of said first function of said parameter for different values of said variable, b. means adapted for producing two further electrical signals which oscillate so as to periodically set up successive representations of said two other functions of said variable for corresponding values of said variable, c. means for detecting instants of equality of said two further electrical signals, and d. means for sampling said first electrical signal at one or more such instants for evaluating said first function of said variable.

2. Apparatus according to claim 1 adapted for evaluating the speed of a yacht to windward or downwind and wherein said means adapted for producing said two further electrical signals includes means for utilising electrical signals which represent the speed through the water of the yacht, and the apparent wind speed and direction respectively.

3. An indicator according to claim 2 wherein said means adapted for producing said two further electrical signals includes an electrical oscillator, and means for deriving from output signals of said oscillator 1. a signal with an amplitude representing said speed through the water, and
2. a signal with a phase angle representing said apparent wind direction, and an amplitude representing said apparent wind speed, thereby to provide said two further electrical signals.

4. An indicator according to claim 3 wherein said means adapted for producing said first electrical signal includes means for deriving from an output signal of said oscillator a signal in phase quadrature with, and of the same amplitude as, said signal with an amplitude representing said speed through the water.

* * * * *